United States Patent [19]

Yoshimura et al.

[11] Patent Number: 5,477,120
[45] Date of Patent: Dec. 19, 1995

[54] METHOD FOR DRIVING STEPPING MOTOR OF MULTIPHASE HYBRID TYPE

[75] Inventors: Noriyuki Yoshimura; Kenji Yoshida, both of Kitasaku, Japan

[73] Assignee: Minebea Co. Ltd., Nagano, Japan

[21] Appl. No.: 313,128

[22] PCT Filed: Feb. 1, 1994

[86] PCT No.: PCT/JP94/00139

§ 371 Date: Dec. 21, 1994

§ 102(e) Date: Dec. 21, 1994

[87] PCT Pub. No.: WO94/18743

PCT Pub. Date: Aug. 18, 1994

[30] Foreign Application Priority Data

Feb. 1, 1993 [JP] Japan .................. 5-036057

[51] Int. Cl.⁶ .................................................. H02K 37/00
[52] U.S. Cl. .................. 318/696; 318/135; 318/685; 318/687; 310/49 R
[58] Field of Search ..................... 318/696, 138, 318/685–687, 254, 135; 310/254, 49 R, 156, 154, 49 X, 162, 12–14

[56] References Cited

U.S. PATENT DOCUMENTS

| | | | |
|---|---|---|---|
| 4,675,564 | 6/1987 | Isozaki | 310/49 R |
| 4,712,028 | 12/1987 | Horber | 310/49 R |
| 4,713,570 | 12/1987 | Mastromattei | 310/154 |
| 4,873,462 | 10/1989 | Harned | 310/49 R |
| 4,890,024 | 12/1989 | Hashimoto et al. | 310/49 R |
| 5,128,570 | 7/1992 | Isozaki | 310/49 R |
| 5,283,486 | 2/1994 | Kobori | 310/49 R |
| 5,289,064 | 2/1994 | Sakamoto | 310/49 R |
| 5,309,051 | 5/1994 | Kobori | 310/49 R |
| 5,315,192 | 5/1994 | Satomi | 310/49 R |
| 5,386,161 | 1/1995 | Sakamoto | 310/49 R |

*Primary Examiner*—Paul Ip
*Attorney, Agent, or Firm*—Staas & Halsey

[57] ABSTRACT

In a hybrid type stepping motor, variation in the torque is reduced to as low as possible, the torque stiffness is improved, and the resonant vibration during the rotating movement is minimized. Each fixed magnetic pole has two or more of small teeth thereof arranged at intervals of the same pitch as of the teeth of a rotor. The total number (NS) of the small teeth of a stator segment of an asymmetrical form is determined by $NS=5\times(n0+n1)$, where $n0$ is the number of the small teeth on each of five of the ten fixed magnetic poles and $n1$ is the number of the small teeth on each of the remaining five fixed magnetic poles. The fixed magnetic poles with the $n1$ small teeth are arranged alternate with the fixed magnetic poles with tile $n0$ small teeth. The $n1$ small teeth poles and the $n0$ small teeth poles are disposed opposite to each other about the axis of a rotary shaft. The relation between the total number (NR) of the teeth of the rotor and the total number (NS) of the small teeth of the stator segment is expressed by $NS \geq 0.8\text{-}NR$ (NS being greater than or equal to 0.8-NR). A difference between NR and NS is calculated from $NR-NS=K(S0-S1)+10(S1-1+B)$ where K is an integer from 2 to 5, S0 and S1 are smallest possible integers or may be equal, and B is a fraction of 1 so that 10B is always an integer. Ten windings on their respective fixed magnetic poles are energized by a power supplying means to produce desired numbers of N and S poles. The full step angle is equal to an electric angle $90°=aH=360°/10NR$ and thus, the half step angle is an electric angle $45°=aH=360°/20\ NR$. In action, the magnetization of the fixed magnetic poles at each step produces N and S poles of the same number.

1 Claim, 7 Drawing Sheets

FIG. 6

| STEP \ POLE | 1 | 2 | 3 | 4 | 5 | 6 | 7 | 8 | 9 | 10 |
|---|---|---|---|---|---|---|---|---|---|---|
| 1 | N | S | - | N | - | S | N | - | S | - |
| 2 | - | S | - | N | S | - | N | - | S | N |
| 3 | - | S | N | - | S | - | N | S | - | N |
| 4 | S | - | N | - | S | N | - | S | - | N |
| 5 | S | - | N | S | - | N | - | S | N | - |
| 6 | S | N | - | S | - | N | S | - | N | - |
| 7 | - | N | - | S | N | - | S | - | N | S |
| 8 | - | N | S | - | N | - | S | N | - | S |
| 9 | N | - | S | - | N | S | - | N | - | S |
| 10 | N | - | S | N | - | S | - | N | S | - |

FIG. 7

| STEP \ POLE | 1 | 2 | 3 | 4 | 5 | 6 | 7 | 8 | 9 | 10 |
|---|---|---|---|---|---|---|---|---|---|---|
| 1 | N | S | S | N | - | S | N | N | S | - |
| 2 | N | S | - | N | - | S | N | - | S | - |
| 3 | N | S | - | N | S | S | N | - | S | N |
| 4 | - | S | - | N | S | - | N | - | S | N |
| 5 | - | S | N | N | S | - | N | S | S | N |
| 6 | - | S | N | - | S | - | N | S | - | N |
| 7 | S | S | N | - | S | N | N | S | - | N |
| 8 | S | - | N | - | S | N | - | S | - | N |
| 9 | S | - | N | S | S | N | - | S | N | N |
| 10 | S | - | N | S | - | N | - | S | N | - |
| 11 | S | N | N | S | - | N | S | S | N | - |
| 12 | S | N | - | S | - | N | S | - | N | - |
| 13 | S | N | - | S | N | N | S | - | N | S |
| 14 | - | N | - | S | N | - | S | - | N | S |
| 15 | - | N | S | S | N | - | S | N | N | S |
| 16 | - | N | S | - | N | - | S | N | - | S |
| 17 | N | N | S | - | N | S | S | N | - | S |
| 18 | N | - | S | - | N | S | - | N | - | S |
| 19 | N | - | S | N | N | S | - | N | S | S |
| 20 | N | - | S | N | - | S | - | N | S | - |

METHOD FOR DRIVING STEPPING MOTOR OF MULTIPHASE HYBRID TYPE

PRIOR ART

The present invention relates to an improved method of driving a 5-phase hybrid stepping motor.

BACKGROUND OF THE INVENTION

Hybrid stepping motors have been well known for over a quarter of the century as actuators appropriated for highly accurate positioning movements. The hybrid stepping motors are widely used in various machine tools, e.g. with fully automated production lines, as well as computer related instruments including printers, plotters, facsimile machines, and disk drive units.

For increasing the versatility in use, there is made an attempt to minimize the step angle of such a hybrid stepping motor. To this respect, four- and five-phase types of the stepping motor are now commonly provided.

The conventional four- or five-phase stepping motors however have some disadvantages that torque stiffness is unstable, that static torque is varied depending on the stop position, and that the step angle is not at a high accuracy. It is an object of the present invention to eliminate the foregoing disadvantages.

SUMMARY OF THE INVENTION

For achievement of the above object, a method of driving a multi-phase hybrid type stepping motor which has a rotor provided with one or more permanent magnets magnetized in the rotating direction of a rotary shaft, according to the present invention, is characterized by a two pole caps mounted to both ends of the permanent magnet respectively, each the pole cap made of a soft magnetic material and having a plurality (NR) of teeth arranged at equal intervals on the circumferential surface thereof, the teeth of the two pole caps being displaced by ½ of the teeth pitch (½ Tp) from each other, a plurality of stator segments of an asymmetrical form disposed around the rotor, each the asymmetrical stator segment having ten fixed magnetic poles thereof extending inwardly and radially, each the fixed magnetic pole having a winding wound thereon with no taps and being provided with two or more small teeth arranged at equal intervals of the same pitch as of the teeth of the rotor, the total number (NS) of the small teeth of the asymmetrical stator segment being determined by $NS=5\times(n0+n1)$, where n0 is the number of the small teeth on each of five of the ten fixed magnetic poles and n1 is the number of the small teeth on each of the remaining five fixed magnetic poles, the fixed magnetic poles with the n1 small teeth being arranged alternate with the fixed magnetic poles with the n0 small teeth, the n1 small teeth pole and the n0 small teeth pole being disposed opposite to each other about the axis of the rotary shaft, the relation between the total number (NR) of the teeth of the rotor and the total number (NS) of the small teeth of the stator segment being expressed by $NS \geq 0.8$-NR (NS being greater than or equal to 0.8-NR), a difference between NR and NS being calculated from $NR-NS=K(S0-S1)+10(S1-1+B)$ where K is an integer from 2 to 5, S0 and S1 are smallest possible integers or may be equal, and B is a fraction of 1 so that 10B (ten times of B) is always an integer, the ten stator windings on their respective fixed magnetic poles being coupled to one another in a circular order of P1, P6, P2, P7, P3 P8, P4, P9, P5, and P10, five terminals disposed between P1 and P10, P6 and P2, P7 and P3, P8 and P4, and P9 and P5 respectively, and by polarization of the ten fixed magnetic poles at each step of the rotating movement, N and S poles of the same number being generated.

BRIEF DESCRIPTION OF THE DRAWINGS

FIG. 6 is a chart showing the magnetic shift at fixed magnetic poles in full-step mode; and FIG. 7 is a chart showing the magnetic shift at the fixed magnetic poles in half-step mode.

THE PREFERRED EMBODIMENTS OF THE PRESENT INVENTION

Preferred embodiments of the present invention will be described in more details referring to the accompanying drawings.

Figure 1:
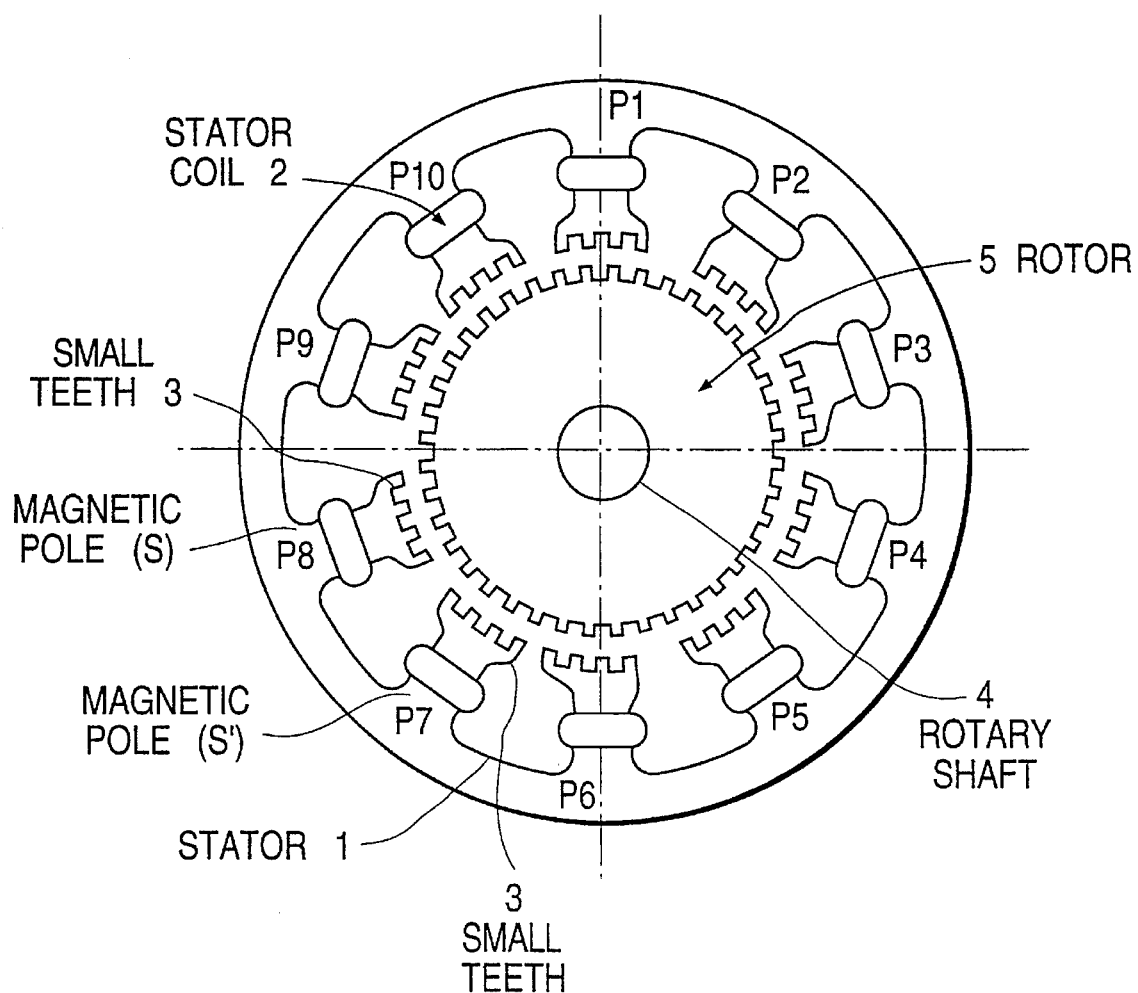
FIG. 1 is a cross sectional view showing one embodiment of the present invention.
Figure 2:
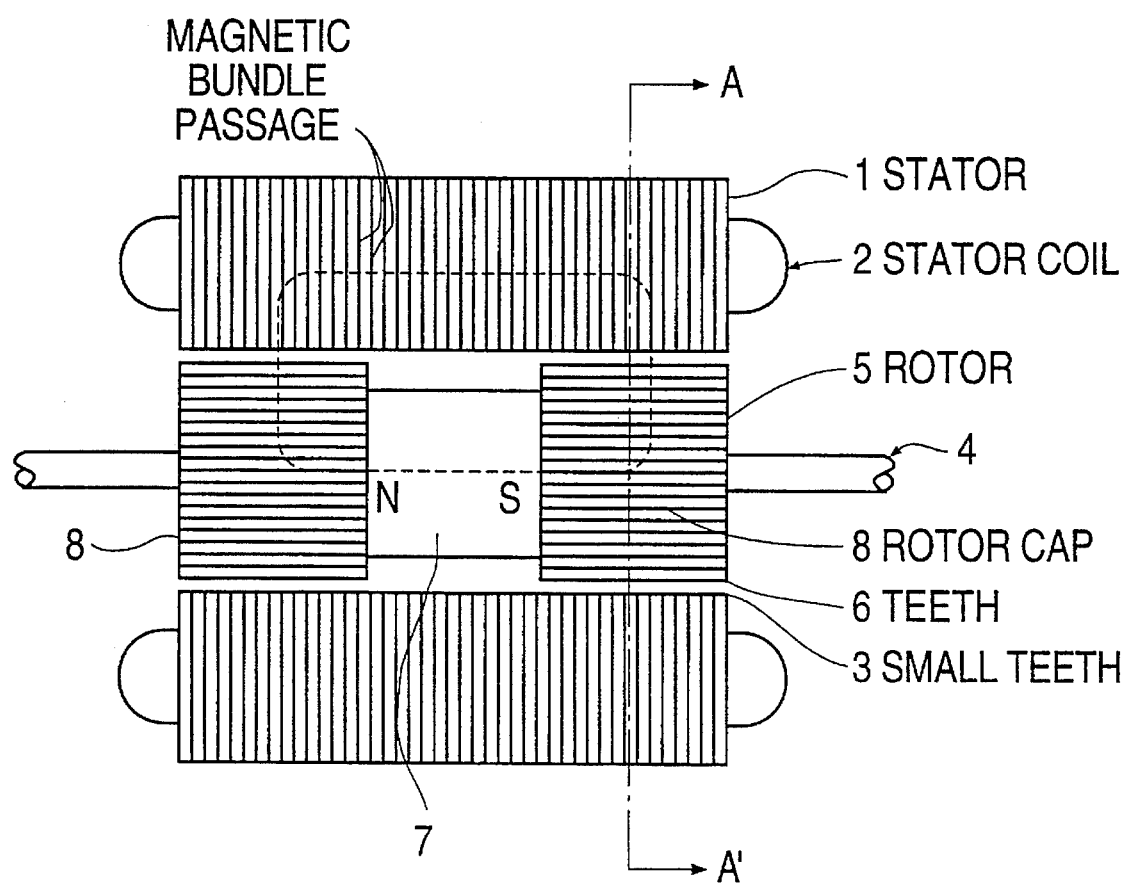
FIG. 2 is a longitudinal sectional view of time embodiment of time present invention.

FIGS. 1 and 2 illustrate in cross section a stepping motor according to the present invention. FIG. 1 is a cross sectional view taken along the line extending at a right angle to a rotary shaft 4. As shown, a stator 1 has ten fixed magnetic poles S, S' arranged inwardly thereof. The fixed magnetic pole S or S' has a stator coil 2 wound thereon and is provided at inward end with a set of small teeth 3. It is assumed that the total number of the small teeth 3 is NS. The rotary shaft 4 has a rotor 5 mounted at center thereto. The rotor 5 has a permanent magnet 7 mounted to the axial center thereof and two rotor caps 8 fitted to both sides of the magnet 7 respectively, as best shown in FIG. 2. The rotor caps 8 have a plurality of teeth 6 provided on the circumferential surface thereof. It is now assumed that the total number of the teeth 6 is NR. FIG. 1 is a cross sectional view taken along the line A—A of FIG. 2. The ten stator coils 2 are numbered from P1 to P10.

Figure 3:
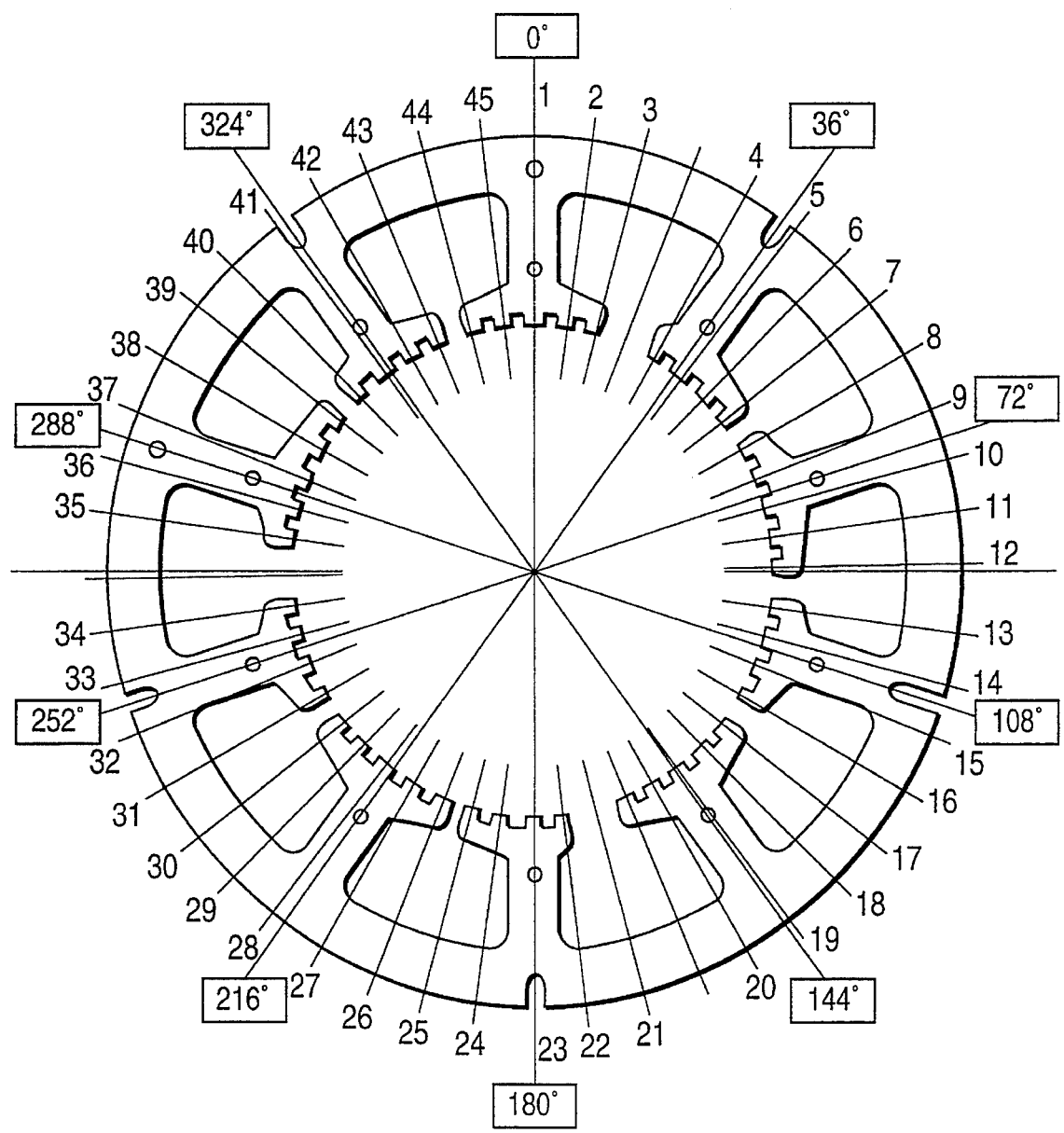
FIG. 3 is a front view of a stator system another embodiment of the present invention.

A first embodiment of the present invention is intended to have a five-phase stepping motor with the ten fixed magnetic poles S, S' improved in the torque stiffness, the step angle precision, and the efficiency of movement when NR=50 (where a shift angle between two adjacent fixed magnetic poles is ⅕ Tp, Tp being a pitch of the small teeth 3). In particular, the number of the small teeth 3 of each alternate one of the ten fixed magnetic poles is increased by one while that of the other fixed magnetic poles is kept 4 (forming an asymmetrical fixed magnetic pole arrangement of the stator). Accordingly, the 4-teeth fixed magnetic pole S is disposed opposite to the 5-teeth fixed magnetic pole S' (FIG. 3).

The difference of the teeth between the rotor 5 and the fixed magnetic poles S,S' is 5 (as calculated by subtracting 4×5 from 50 and then, 5×5 from the result).

This embodiment also offers an improvement in the stability at torque equilibrium position. The reason is that while at least two adjacent fixed magnetic poles are polarized to N, other two adjacent fixed magnetic poles are turned to S (FIG. 6).

As compared with the first embodiment in which the improvement in the four different respects is ensured with the rotor having 40, 50, 80, 90, or 100 of the teeth, using such an asymmetrical arrangement of the ten fixed magnetic poles of the stator, a second embodiment is characterized by the shift angle between two adjacent fixed magnetic poles which is equal to 3/10 Tp or 7/10 Tp. Equally, the number of the small teeth 3 of every alternate one of the fixed magnetic poles is increased by one.

For determining an optimum degree of the step angle for performance of a stepping motor, the difference of teeth between the rotor and the stator is preferably 5 or 3.

Figure 4A:
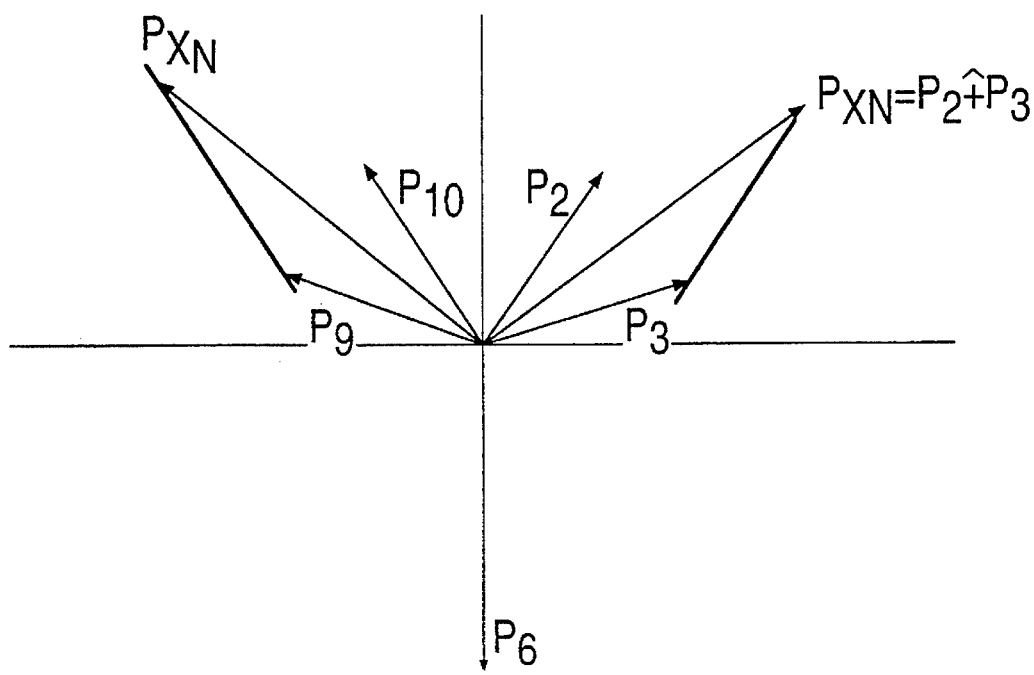
FIG. 4 is a vector diagram of a rotor in the embodiment of time present invention.
Figure 4B:
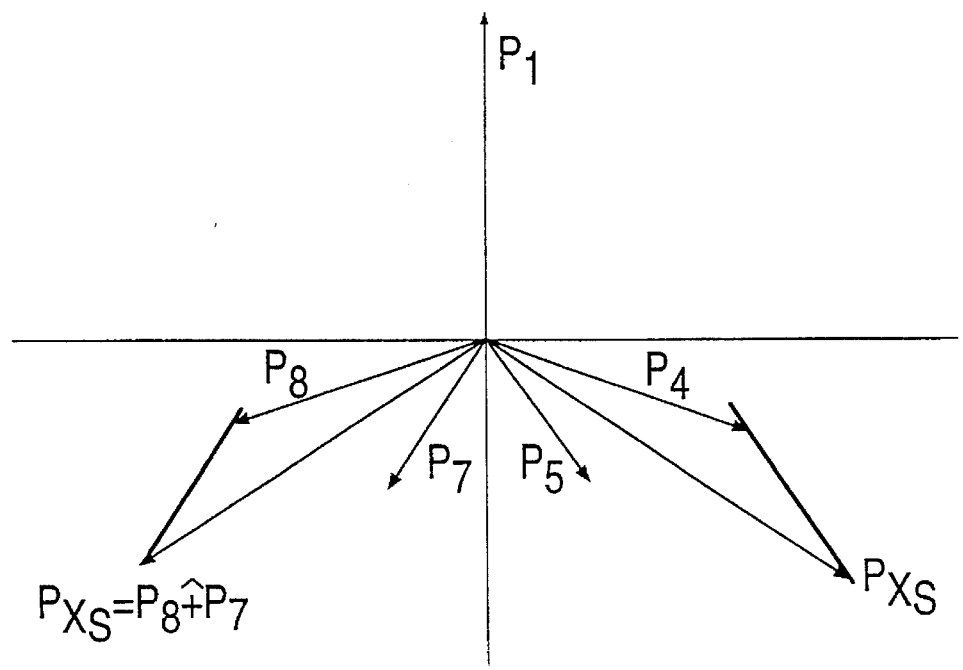

As shown in FIG. 4, a radial stress exerted on the rotor caps is divided into three directions. The stress is evenly applied to the two rotor caps. The three directional components of the stress may less affect the manufacturing tolerance. Thereby, the step angle accuracy will increase and unwanted vibration will be reduced. This is because there are provided only three large distanced slots between the fixed magnetic poles. FIG. 6 shows the polarization of the fixed magnetic poles during a series of 20 consecutive steps. The full 20 steps perform one rotation of the rotary shaft 4. As apparent from FIG. 6, the number of N poles is identical to the number of S poles in the stepping motor at every position or step. This results in reduction of the hysteresis.

Figure 5:
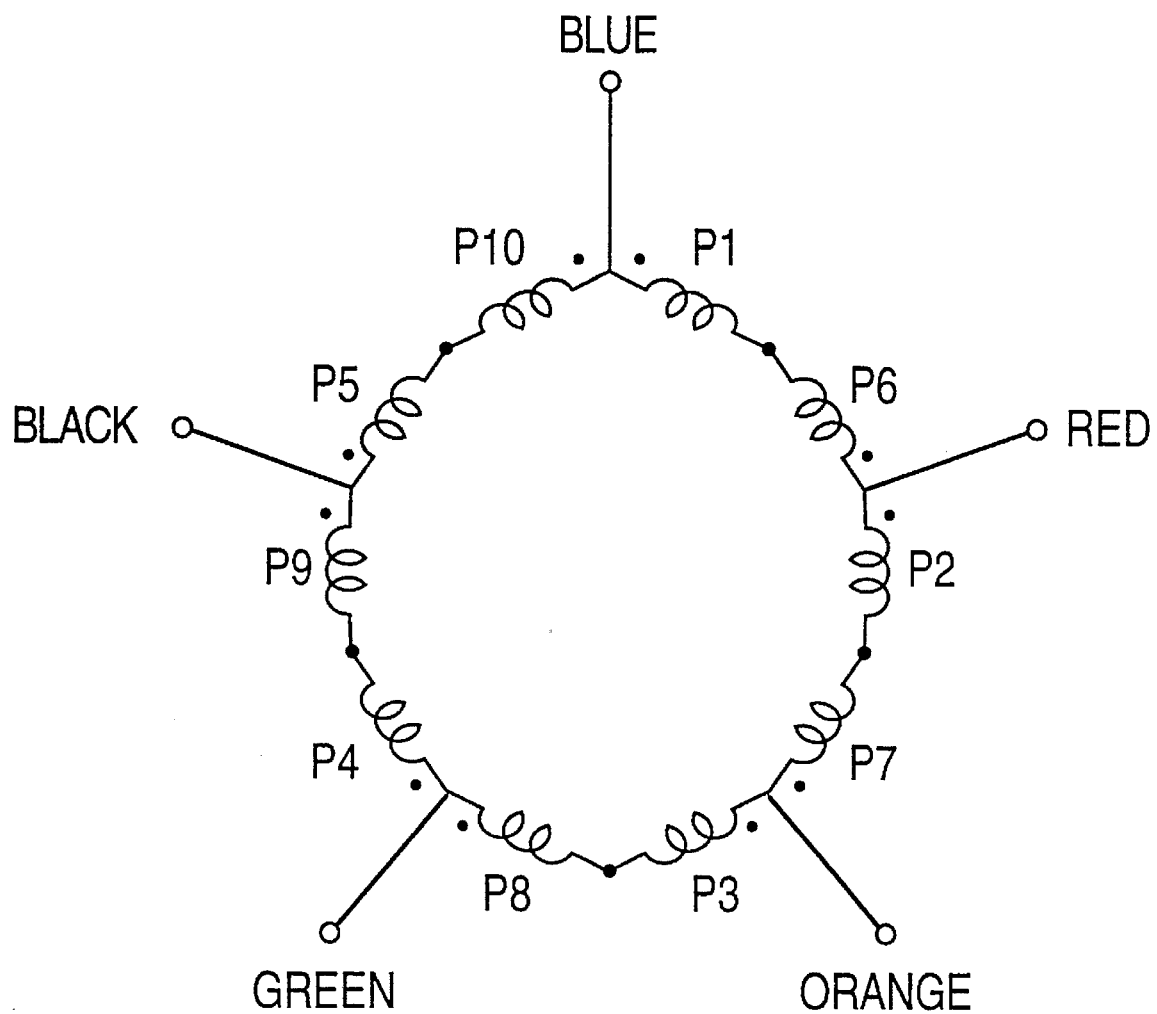
FIG. 5 is a wiring diagram according to the embodiment of the present invention.

The step-by-step rotating movement will now be described referring to FIGS. 5 and 6. FIG. 5 is a wiring diagram according to the embodiment of the present invention. The ten fixed magnetic poles are coupled to one another in a circular order of P1, P6, P2, P7, P3, P8, P4, P9, P5, and P10. Five, blue, red, orange, green, and black colored, terminals are provided between P1 and P10, P6 and P2, P7 and P3, P8 and P4, and P9 and P5 respectively. FIG. 6 is a diagram showing the polarization of the fixed magnetic poles in a full step mode. The dots in FIG. 5 represent the direction of coil windings.

Each of the blue, red, orange, green, and black colored terminals is coupled to a two-throw switch which normally stays in the neutral mode and is turned to one position for connecting to a positive source and to the other position for connecting to a negative source, although its switching circuit is not shown in FIG. 5. The switch is selectively connected to one of the three positions by a command signal from an unshown control unit. Accordingly, the ten magnetic poles are energized to have polarities as shown in FIG. 6 at each step. The switching action at the step produces the two polar states of the same number, as shown in FIG. 6.

FIG. 7 is a diagram showing the polarization of the fixed magnetic poles at the steps in a half step mode.

As set forth above, the present invention with the foregoing arrangement allows the torque stiffness to be stable, the static torque to be equilibrated, and the step angle to be at high accuracy. In both the full and half step modes, the S and N poles of the same number are produced at each step of the movement. This will minimize abnormal vibration during the rotating movement.

APPLICABILITY TO INDUSTRIAL USE

As the specific teeth arrangements of the rotor and the stator are provided in a combination, the static torque acts in equilibrium and the step angle stays at high accuracy. In addition, the S and N poles become equal in the number in the full step mode, abnormal vibration during the rotating movement will be minimized.

What is claimed is:

1. A method of driving a multi-phase hybrid type stepping motor which has a rotor provided with one or more permanent magnets magnetized in the rotating direction of a rotary shaft, characterized by a two pole caps mounted to both ends of the permanent magnet respectively, each the pole cap made of a soft magnetic material and having a plurality (NR) of teeth arranged at equal intervals on the circumferential surface thereof, the teeth of the two pole caps being displaced by ½ of the teeth pitch (½ Tp) from each other, a plurality of stator segments of an asymmetrical form disposed around the rotor, each the asymmetrical stator segment having ten fixed magnetic poles thereof extending inwardly and radially, each the fixed magnetic pole having a winding wound thereon with no taps and being provided with two or more small teeth arranged at equal intervals of the same pitch as of the teeth of the rotor, the total number (NS) of the small teeth of the asymmetrical stator segment being determined by NS=5×(n0+n1), where n0 is the number of the small teeth on each of five of the ten fixed magnetic poles and n1 is the number of the small teeth on each of the remaining five fixed magnetic poles, the fixed magnetic poles with the n1 small teeth being arranged alternate with the fixed magnetic poles with the n0 small teeth, the n1 small teeth pole and the n0 small teeth pole being disposed opposite to each other about the axis of the rotary shaft, the relation between the total number (NR) of the teeth of the rotor and the total number (NS) of the small teeth of the stator segment being expressed by NS2420.8-NR (NS being greater than or equal to 0.8-NR), a difference between NR and NS being calculated from NR−NS=K(S0−S1)+10(S1−1+B) where K is an integer from 2 to 5, S0 and S1 are smallest possible integers or may be equal, and B is a fraction of 1 so that 10 B (ten times of B) is always an integer, the ten stator windings on their respective fixed magnetic poles being coupled to one another in a circular order of P1, P6, P2, P7, P3, PS, P4, P9, P5, and P10, five terminals disposed between P1 and P10, P6 and P2, P7 and P3, P8 and P4, and P9 and P5 respectively, and by polarization of the ten fixed magnetic poles at each step of the rotating movement, N and S poles of the same number being generated.

\* \* \* \* \*

UNITED STATES PATENT AND TRADEMARK OFFICE
CERTIFICATE OF CORRECTION

PATENT NO. : 5,477,120
DATED : December 19, 1995
INVENTOR(S) : Noriyuki YOSHIMURA et al.

It is certified that error appears in the above-indentified patent and that said Letters Patent is hereby corrected as shown below:

Title Page, [56], in References Cited, change "5,128,570" to –5,128,520–.

Signed and Sealed this

Seventh Day of May, 1996

Attest:

BRUCE LEHMAN

Attesting Officer     Commissioner of Patents and Trademarks